United States Patent

Schramm

[11] Patent Number: 5,918,525
[45] Date of Patent: Jul. 6, 1999

[54] RECIPROCATING SAW BLADE

[75] Inventor: Norbert Schramm, Remscheid, Germany

[73] Assignee: Wilh. Putsch OHG, Remscheid, Germany

[21] Appl. No.: 08/783,258

[22] Filed: Jan. 14, 1997

[30] Foreign Application Priority Data

Jan. 15, 1996 [DE] Germany ............ 296 00 567 U

[51] Int. Cl.⁶ ..................................... B26D 1/00
[52] U.S. Cl. ................ 83/835; 83/837; 83/848; 83/852
[58] Field of Search ............ 83/835, 837, 846, 83/847, 848, 852; 30/392, 501, 502

[56] References Cited

U.S. PATENT DOCUMENTS

| | | | |
|---|---|---|---|
| 239,710 | 4/1881 | Boynton | 83/847 |
| 468,150 | 2/1892 | Kerr | 83/852 |
| 601,947 | 4/1898 | Clemson | 83/852 |
| 3,680,610 | 8/1972 | Lindgren | 30/502 |
| 4,492,141 | 1/1985 | Takeuchi | 83/852 |
| 4,784,034 | 11/1988 | Stones et al. | 83/852 |
| 4,999,915 | 3/1991 | Jackson et al. | 83/852 |

*Primary Examiner*—M. Rachuba
*Attorney, Agent, or Firm*—Herbert Dubno; Andrew Wilford

[57] ABSTRACT

A reciprocating saw blade moved in opposite directions parallel to a longitudinal axis is formed with at least one row of longitudinally succeeding teeth having tips all lying on a common tip line parallel to the longitudinal axis and including even teeth all oriented in one direction parallel to the axis and odd teeth alternating with the even teeth and all oriented in the opposite direction parallel to the axis. Each even tooth forms with one of the adjacent odd teeth a double tooth and the tips of the teeth of each double tooth are set laterally of the blade to one side with the lateral set by an offset that alternates longitudinally from double tooth to double tooth to opposite sides of a center blade plane. The offset is the same for all teeth. Each tooth has a relatively steep leading edge and a relatively shallow trailing edge, relative of course to the respective longitudinal direction.

8 Claims, 2 Drawing Sheets

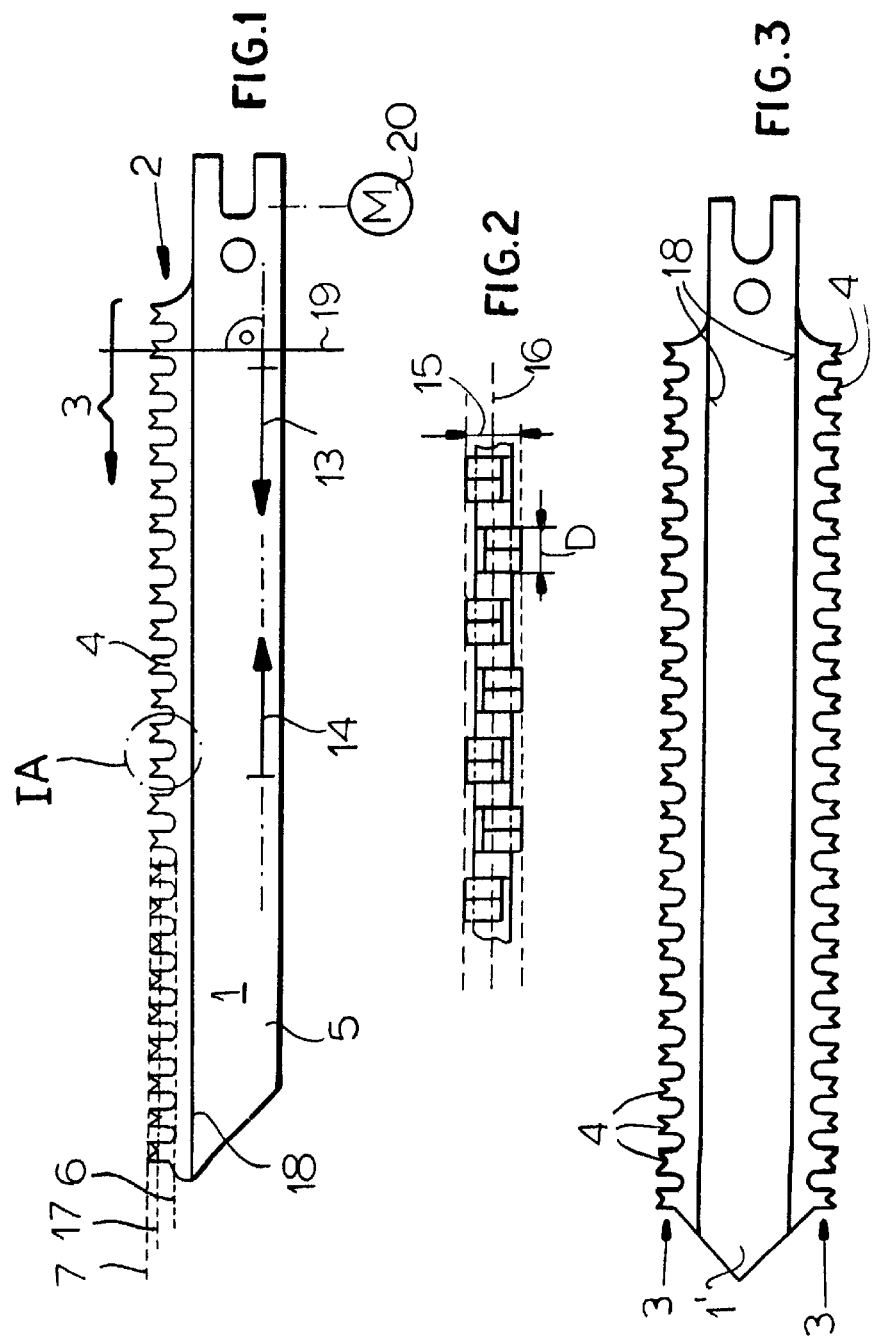

RECIPROCATING SAW BLADE

FIELD OF THE INVENTION

The present invention relates to a saw blade. More particularly this invention concerns such a blade that is reciprocated in use.

BACKGROUND OF THE INVENTION

In a reciprocating or scroll saw it is standard for the blade to be elongated and to be moved back and forth in a straight line parallel to its longitudinal axis. As described in "Sägenhaft" (WILPU; 1995) such blades are normally intended to cut in one direction. To this end the teeth are generally triangular, with relative to a forward sawing direction a steep front flank and a shallow rear flank, and set so that they cut into the workpiece in only the forward direction, normally while moving upward, and simply slide without cutting when moving oppositely. When such a saw blade is driven by a crank mechanism it is also fairly common for it to move somewhat perpendicular to its longitudinal direction, advancing forward at the start of its cutting stroke and backward slightly before its noncutting return stroke. Otherwise during the return stroke the blade rubs uselessly on the workpiece, heating it while doing no useful work.

While a standard pruning saw has teeth that are basically M-shaped, such a saw cannot cut in both directions. Instead it cuts on the forward stroke but jumps when pulled back. The teeth of such as saw are normally totally planar and not sharpened.

OBJECTS OF THE INVENTION

It is therefore an object of the present invention to provide an improved reciprocating saw blade.

Another object is the provision of such an improved reciprocating saw blade which overcomes the above-given disadvantages, that is which cuts well in both directions without clogging.

SUMMARY OF THE INVENTION

A reciprocating saw blade moved in opposite directions parallel to a longitudinal axis is formed with at least one row of longitudinally succeeding teeth having tips all lying on a common tip line parallel to the longitudinal axis and including even teeth all oriented in one direction parallel to the axis and odd teeth alternating with the even teeth and all oriented in the opposite direction parallel to the axis. Each even tooth forms with one of the adjacent odd teeth a double tooth and the tips of the teeth of each M-shaped double tooth are set laterally of the blade to one side with the lateral set by an offset that alternates longitudinally from double tooth to double tooth to opposite sides of a center blade plane. The offset is the same for all teeth. Each tooth has a relatively steep sharpened leading edge and a relatively shallow trailing edge, relative of course to the respective longitudinal direction.

Thus this blade cuts effectively in both directions. Due to the pairing of the teeth and the offset, the backward-facing teeth do not drag in the workpiece but instead move clear in the wake or kerf formed by the preceding forward-facing tooth. Thus the blade can normally cut twice as fast, as the wasted return stroke is used for cutting also. Such a blade can be used in a conventional reciprocating saw of the scroll or saber type. At the same time the blade can be produced at roughly the same cost as the prior-art single-direction blades so that the increase in cutting efficiency comes virtually at no cost.

According to the invention each steep edge extends at about 90° to the tip line. In addition in each double tooth the respective steep flanks are turned longitudinally away from each other and the respective shallow flanks meet at point lying on a line positioned about one-third of the way from the tip line to a base line defined by lower ends of the steep flanks. The blade is formed with outwardly open notches between steep flanks of adjacent teeth. The steep flanks are rounded at bases of the notches.

Alternately the blade can be formed in a center of each double tooth with an outwardly open notch. Also it is possible for the blade to have a longitudinally extending back edge formed with another such row of double teeth.

Each double tooth according the invention is symmetrical to a respective axis perpendicular to the tip line. In addition the teeth are formed of a harder material than the rest of the blade.

BRIEF DESCRIPTION OF THE DRAWINGS

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 1 is a partly diagrammatic side view of a saw blade according to the invention;

FIG. 1A is a large-scale view of the detail indicated at 1A in FIG. 1;

FIG. 2 is an edge view of the blade of FIG. 1;

FIG. 3 is a view like FIG. 1 of another blade according to the invention;

SPECIFIC DESCRIPTION

Figure 4:
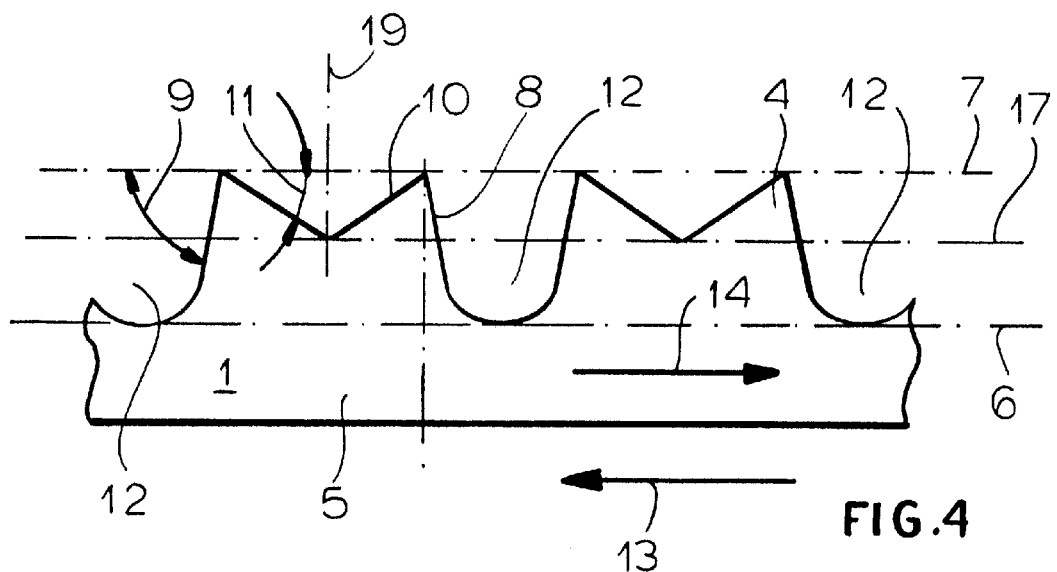
FIG. 4 is another detail view of the saw blade according to the invention.

As seen in FIGS. 1, 1A, 2, 4, and 5 a saw blade 1 according to the invention has a front edge 2 provided with a row 3 of teeth 4 and a back edge 5 that is straight and plain. The teeth 4 are sharpened and set and each tooth 4 has a leading edge 8 extending at an angle 9 of between 75° and 90° to lines 6 and 7 running along the tips and bases of the teeth 3, parallel to forward and reverse directions 13 and 14 and a trailing edge 10 forming an angle 11 of about 45° with the lines 6 and 7. Half of the teeth 4 (the odd teeth) have their leading edges 8 directed forward in the forward cutting direction and the intervening teeth 4 (the even teeth) have their leading edges 8 directed oppositely in the reverse direction. A drive motor 20 is provided to move the blade 1 parallel to its longitudinal axis, that is in the parallel directions 13 and 14 without displacing it laterally at all relative to these directions, that is the blade 1 moves purely in a straight line.

Each tooth 4 forms with one of its oppositely directed adjacent teeth 4 a double tooth D (FIG. 5) and each double tooth D is separated from the adjacent double tooth D by a notch 12 defined between two leading edges 8 and extending down to the base line 6. Each double tooth D is symmetrical to a centerline 19 extending perpendicular to the lines 6 and 7 and to a line 17 running along the lower ends of the back edges 10. The base line 17 of the shallow flank or edge 10 is about one-third of the way from the line 7 to the line 6.

Figure 5:
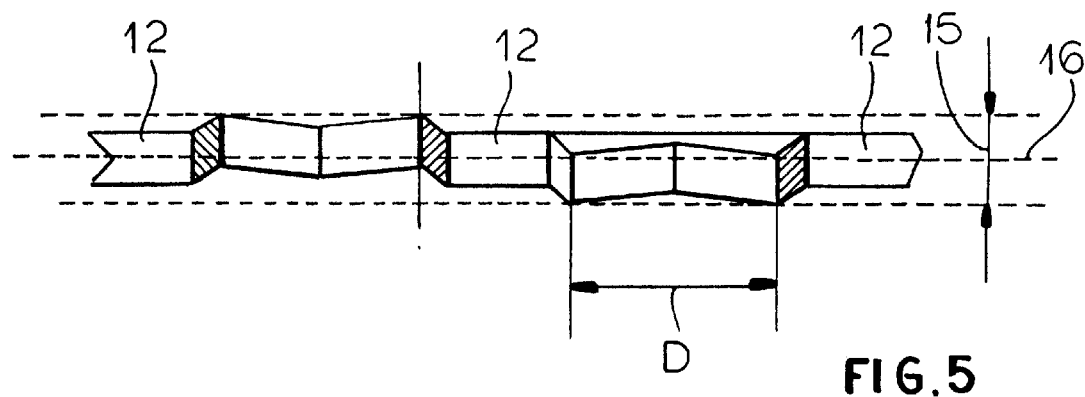
FIG. 5 is an edge view of the structure of FIG. 4.

According to the invention as shown in FIGS. 2 and 5, the double teeth D are alternately laterally offset by a spacing 15 from a central blade plane 16. Thus two teeth 4 are set to one side of this plane 16, the next two to the other side, and so on.

Figure 6:
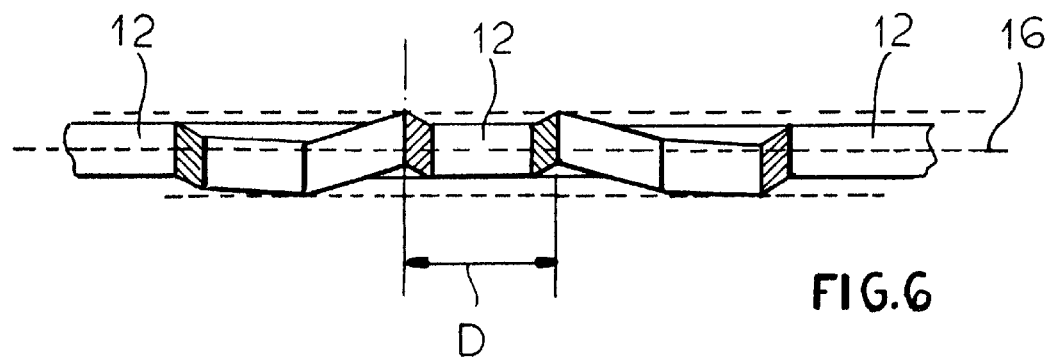
FIG. 6 is a view like FIG. 5 of an alternative system according to the invention.

FIG. 6 shows how each double tooth D' is defined by two teeth 4 separated by a gap 12. Nonetheless here also the double teeth D' are alternately set to opposite sides of the plane 18.

The blade 1 can be made of two parts, a hard edge part with an HRC hardness of 65 forming the teeth 4 and a core part of an HRC hardness of 55 joined at a longitudinal seam 18 to the edge part. The seam 18 is slightly offset inward from the line 6. Such a bimetal blade is extremely durable.

FIG. 3 shows how two such rows 3 of teeth 4 can be provided on a single blade 1', joined at a pair of such seams 18.

I claim:

1. A reciprocating saw blade moved in opposite directions parallel to a longitudinal axis, the blade being formed along at least one longitudinal edge with a single row of longitudinally succeeding teeth having tips all lying on a common tip line parallel to the longitudinal axis and including even teeth all oriented in one direction parallel to the axis and odd teeth alternating with the even teeth and all oriented in the opposite direction parallel to the axis, each tooth having relative to the respective direction a relatively steep leading edge and a relatively shallow trailing edge, each even tooth forming with one of the adjacent odd teeth a double tooth and both of the tips of the teeth of each double tooth being set laterally of the blade to one side by an offset that alternates longitudinally from double tooth to double tooth to opposite sides of a center blade plane, the offset being the same for all teeth, the teeth being formed of a harder material than the rest of the blade.

2. The reciprocating saw blade defined in claim 1 wherein each steep edge extends at about 90° to the tip line.

3. The reciprocating saw blade defined in claim 1 wherein in each double tooth the respective steep flanks are turned longitudinally away from each other and the respective shallow flanks meet at point lying on a line positioned about one-third of the way from the tip line to a base line defined by lower ends of the steep flanks.

4. The reciprocating saw blade defined in claim 1 wherein each steep edge extends at about 90° to the tip line and the blade is formed with outwardly open notches between steep flanks of adjacent teeth, the steep flanks being rounded at bases of the notches.

5. The reciprocating saw blade defined in claim 1 wherein the blade is formed in a center of each double tooth with an outwardly open notch.

6. The reciprocating saw blade defined in claim 1 wherein the blade has a longitudinally extending back edge formed with a row of double teeth substantially identical to the row of double teeth on the one edge.

7. The reciprocating saw blade defined in claim 1 wherein each double tooth is symmetrical to a respective axis perpendicular to the tip line.

8. The reciprocating saw blade defined in claim 1 wherein the teeth have a hardness of 65 HRC and the rest of the blade a hardness of 50 HRC.

* * * * *